United States Patent
Sah et al.

(10) Patent No.: US 8,287,427 B2
(45) Date of Patent: Oct. 16, 2012

(54) MULTI-MODE HYBRID TRANSMISSION AND SHIFT CONTROL METHOD FOR A MULTI-MODE HYBRID TRANSMISSION

(75) Inventors: Jy-Jen F. Sah, West Bloomfield, MI (US); Brendan M. Conlon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 735 days.

(21) Appl. No.: 12/399,086

(22) Filed: Mar. 6, 2009

(65) Prior Publication Data

US 2010/0227735 A1    Sep. 9, 2010

(51) Int. Cl.
*B60K 1/02* (2006.01)

(52) U.S. Cl. .............................. 477/3; 701/22

(58) Field of Classification Search .................. 477/3, 5, 477/6, 7, 8, 9, 10, 11, 15, 19, 20, 21, 26, 477/27, 28; 475/5; 903/945; 701/22, 54, 701/55; 180/65.275, 65.28, 65.7, 65.285
See application file for complete search history.

(56) References Cited

U.S. PATENT DOCUMENTS

| | | | |
|---|---|---|---|
| 7,010,406 B2 | 3/2006 | Sah et al. | |
| 7,103,463 B2 * | 9/2006 | Sah et al. | 701/67 |
| 7,130,734 B2 | 10/2006 | Sah et al. | |
| 7,217,211 B2 | 5/2007 | Klemen et al. | |
| 7,324,885 B2 | 1/2008 | Sah et al. | |
| 7,356,398 B2 | 4/2008 | Steinmetz et al. | |
| 7,908,063 B2 * | 3/2011 | Sah | 701/51 |
| 8,021,256 B2 * | 9/2011 | Conlon et al. | 475/5 |
| 2006/0276289 A1 * | 12/2006 | Hirata et al. | 475/5 |
| 2007/0276569 A1 | 11/2007 | Sah et al. | |
| 2008/0228364 A1 * | 9/2008 | Osselaere et al. | 701/67 |
| 2008/0318727 A1 * | 12/2008 | Matsubara et al. | 477/3 |
| 2009/0171522 A1 * | 7/2009 | Luo et al. | 701/22 |
| 2009/0275439 A1 * | 11/2009 | Kersting | 475/5 |

* cited by examiner

*Primary Examiner* — Katy M Ebner
*Assistant Examiner* — Emma K Frick
(74) *Attorney, Agent, or Firm* — Quinn Law Group, PLLC

(57) ABSTRACT

A multi-mode, electrically variable, hybrid transmission and improved shift control methods for controlling the same are provided herein. The hybrid transmission configuration and shift control methodology presented herein allow for shifting between different EVT modes when the engine is off, while maintaining propulsion capability and minimum time delay for engine autostart. The shift control maneuver is able to maintain zero engine speed while producing continuous output torque throughout the shift by eliminating transition through a fixed gear mode or neutral state. Optional oncoming clutch pre-fill strategies and mid-point abort logic minimize the time to complete shift, and reduce the engine start delay if an intermittent autostart operation is initiated.

11 Claims, 3 Drawing Sheets

| Transmission State | C4  | C3  | C2  | C1  |
| --- | --- | --- | --- | --- |
| Neutral 1 | Off | Off | Off | Off |
| ETC 1 | Off | Off | Off | ON |
| ETC 2 | Off | Off | ON | Off |
| ETC 12 | Off | Off | ON | ON |
| Neutral 2 | Off | ON | Off | Off |
| EVT 1 | Off | ON | Off | ON |
| EVT 4 | Off | ON | ON | Off |
| Park | Off | ON | ON | ON |
| Neutral 3 | ON | Off | Off | Off |
| EVT 2 | ON | Off | Off | ON |
| EVT 3 | ON | Off | ON | Off |
| FG 2 | ON | Off | ON | ON |
| Neutral 4 | ON | ON | Off | Off |
| FG 1 | ON | ON | Off | ON |
| FG 3 | ON | ON | ON | Off |

MULTI-MODE HYBRID TRANSMISSION AND SHIFT CONTROL METHOD FOR A MULTI-MODE HYBRID TRANSMISSION

TECHNICAL FIELD

The present invention relates generally to hybrid powertrains for motorized vehicles, and more specifically to shift control methods for regulating operation of a multi-mode hybrid transmission, and hybrid transmissions using the same.

BACKGROUND OF THE INVENTION

Most conventional motorized vehicles, such as the modern-day automobile, include a powertrain that operates to propel the vehicle and power the onboard vehicle electronics. The powertrain, which is sometimes referred to as a "drivetrain", is generally comprised of an engine that delivers driving power to the vehicle's final drive system (e.g., rear differential, axle, and wheels) through a multi-speed power transmission. Automobiles have traditionally been powered solely by a reciprocating-piston type internal combustion engine (ICE) because of its ready availability and relatively inexpensive cost, light weight, and overall efficiency. Such engines include 4-stroke compression-ignited diesel engines and 4-stroke spark-ignited gasoline engines.

Hybrid vehicles, on the other hand, utilize alternative power sources to propel the vehicle, minimizing reliance on the engine for power, increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles can be turned off while the vehicle is propelled by the alternative power source(s).

Series hybrid architectures, sometimes referred to as Range-Extended Electric Vehicles (REEVs), are generally characterized by an internal combustion engine in driving communication with an electric generator. The electric generator, in turn, provides power to one or more electric motors that operate to rotate the final drive members. In effect, there is no direct mechanical connection between the engine and the drive members in a series hybrid powertrain. The lack of a mechanical link between the engine and wheels allows the engine to be run at a constant and efficient rate—e.g., closer to the theoretical limit of 37%, rather than the normal average of 20%, even as vehicle speed changes. The electric generator may also operate in a motoring mode to provide a starting function to the internal combustion engine. This system may also allow the electric motor(s) to recover energy from slowing the vehicle and storing it in the battery by regenerative braking.

Parallel hybrid architectures are generally characterized by an internal combustion engine and one or more electric motor/generator assemblies, each of which has a direct mechanical coupling to the power transmission. Most parallel hybrid designs combine a large electrical generator and a motor into one unit, providing tractive power and replacing both the conventional starter motor and the alternator. One such parallel hybrid powertrain architecture comprises a two-mode, compound-split, electro-mechanical transmission which utilizes an input member for receiving power from the ICE, and an output member for delivering power from the transmission to the driveshaft. First and second motor/generators operate individually or in concert to rotate the transmission output shaft. The motor/generators are electrically connected to an energy storage device for interchanging electrical power between the storage device and the first and second motor/generators. A control unit is employed for regulating the electrical power interchange between the energy storage device and motor/generators, as well as the electrical power interchange between the first and second motor/generators.

Electrically variable transmissions (EVT) provide for continuously variable speed ratios by combining features from both series and parallel hybrid powertrain architectures. EVTs are operable with a direct mechanical path between the internal combustion engine and final drive, thus enabling relatively high transmission efficiency and the application of lower cost, less massive motor hardware. EVTs are also operable with engine operation that is mechanically independent from the final drive, in various mechanical/electrical split contributions, thereby enabling high-torque continuously-variable speed ratios, electrically dominated launches, regenerative braking, engine-off idling, and two-mode operation.

An EVT can use what is commonly known as "differential gearing" to achieve continuously variable torque and speed ratios between input and output without sending all power through the variable elements. The EVT can utilize the differential gearing to send a fraction of its transmitted power through the electric motor/generator(s). The remainder of its power is sent through another, parallel path that is mechanical and direct (i.e., "fixed ratio"), or alternatively selectable. One form of differential gearing is the epicyclic planetary gear arrangement. Planetary gearing offers the advantage of compactness and different torque and speed ratios among all members of the planetary gearing subset. However, it is possible to design a power split transmission without planetary gears, for example, as by using bevel gears or other differential gearing.

Traditionally, a number of hydraulically actuated torque establishing devices, such as clutches and brakes (the term "clutch" used hereinafter to refer to both clutches and brakes), are selectively engageable to activate the aforementioned gear elements for establishing desired forward and reverse speed ratios between the transmission's input and output shafts. Shifting from one speed ratio to another is performed in response to engine throttle and vehicle speed, and generally involves releasing one or more "off-going" clutches associated with the current or attained speed ratio, and applying one or more "on-coming" clutches associated with the desired or commanded speed ratio. The speed ratio is generally defined as the transmission input speed divided by the transmission output speed. Thus, a low gear range has a high speed ratio, whereas a high gear range has a lower speed ratio.

In general, ratio changes in a transmission should be performed such that torque disturbances are minimized, and the shifts are "smooth" and "unobjectionable". Additionally, release and application of clutches should be performed in a manner which consumes the least amount of energy, and does not negatively impact durability of the clutches. A major factor affecting these considerations is the torque at the clutch being controlled, which may vary significantly in accordance with such performance demands as acceleration and vehicle loading. In certain EVTs, shift torque reductions can be accomplished by a zero, or close to zero, torque condition at the clutches at the time of application or release, which condition follows substantially zero slip across the clutch.

The range change in some EVTs is controlled through a two-clutch synchronization and release process. Therein, a first clutch associated with a currently active range is carrying torque in an applied state, while a second clutch associated with a currently inactive second range is carrying no torque in a released state. Shifting from a first range to a second range is accomplished by controlling the unapplied clutch to zero slip speed, and applying the clutch thereby placing the EVT in a two clutch application state. During the two-clutch application state, the engine is directly mechanically coupled to the transmission output. The two clutch application state is then exited, and the second range effected by the release of the first clutch during control of the first clutch to zero slip speed.

Conventional EVTs are designed to operate in both fixed gear (FG) modes and electrically variable (EVT) modes through the controlled activation of the torque-transfer clutches described above, typically employing a hydraulic control circuit to regulate clutch actuation. When operating in a fixed gear mode, the rotational speed of the transmission output member is a fixed ratio of rotational speed of the input member from the engine, depending upon the selected arrangement of the aforementioned differential gearing subsets. When operating in an EVT mode, the rotational speed of the transmission output member is variable, based upon operating speeds of the aforementioned electrical motor/generators, which can be connected to the transmission output via actuation of a clutch, or by direct connection.

Many electric hybrid transmission configurations are capable of vehicle propulsion with the engine stopped. Powertrain functionality must remain functional during engine-off operation to meet operator demands and ever-changing operating conditions. For optimal efficiency and performance, the transmission should be able to shift between different EVT modes based on driver demands and vehicle speed. Typically, shifting from one EVT mode to another EVT mode in a synchronous manner is impossible when the engine is stopped because the intermediate state is a fixed gear.

SUMMARY OF THE INVENTION

A multi-mode, electrically variable, hybrid transmission and improved shift control methods for regulating the same are provided herein. The hybrid transmission configuration and shift control methodology of the present intention allow for shifting between different EVT modes when the engine is off, while maintaining propulsion capability and minimum time delay for engine autostart. The shift control maneuver is able to maintain zero engine speed while producing continuous output torque throughout the shift by eliminating unnecessary transitions through a fixed gear mode or neutral state. Optional oncoming clutch pre-fill strategies minimize the time required to complete the shift. Mid-point abort logic may be implemented to reduce the engine start delay if an intermittent autostart operation is initiated.

According to one embodiment of the present invention, a method for regulating operation of a multi-mode hybrid transmission is provided. The method includes: deactivating a first of at least two off-going clutches operable to control the transmission in a first electrically variable transmission (EVT) mode; actuating a first of at least two oncoming clutches operable to control the transmission in a second EVT mode; deactivating a second of the at least two off-going clutches operable to control the transmission in the first EVT mode; and actuating a second of the at least two oncoming clutches operable to control the transmission in the second EVT mode, which operates to thereby shift or transition the transmission to the second EVT mode. The engine is in an off-state during deactivation of the first and second off-going clutches and actuation of the first and second oncoming clutches.

According to one aspect of this particular embodiment, deactivation of the first off-going clutch operates to transition the transmission to a first electric torque converter (ETC) mode. Likewise, actuation of the first oncoming clutch shifts the transmission to a second ETC mode. Similarly, deactivation of the second off-going clutch operates to shift the transmission to a third ETC mode. In ETC mode, one or more motor/generator assemblies cooperates with the transmission's differential gearing to constitute an electric torque converter (ETC) adapted to control the amount of torque transmitted by the engine assembly through the transmission.

As part of another feature of this embodiment, the hybrid transmission does not have to transition through a neutral mode or a fixed gear (FG) mode when transitioning from one EVT mode (i.e., a "first" or "initial" EVT mode) to another EVT mode (i.e., a "second" or "target" EVT mode). In a similar respect, the transmission continuously produces an output torque when shifting from the first EVT mode to the second EVT mode.

In accordance with another aspect, the method also includes: determining if an engine autostart operation is commanded; if so, determining if a predetermined transition midpoint has been reached; and commanding an abort sequence if the engine autostart operation is commanded and the predetermined transition midpoint has not been reached. Ideally, the predetermined transition midpoint is when the first oncoming clutch is actuated. To this regard, the abort sequence includes transitioning the transmission back to the first (initial) EVT mode. That is, when an engine start command is received prior to the midpoint, the shift maneuver aborts back to the initial EVT mode. If at or past the transition midpoint, the method continues to shift toward the target EVT mode.

As part of another aspect of this embodiment, deactivating the first off-going clutch includes exhausting the first off-going clutch to a predetermined fill level prior to actuating the first oncoming clutch. If engine autostart is not initiated and the first oncoming clutch is actuated, the first off-going clutch is then completely released.

In accordance with yet another facet of this embodiment, the method will first determine if an EVT-to-EVT mode shift sequence is commanded and, if so, respond by immediately pre-filling the two oncoming clutches to a predetermined pre-fill level. Thereafter, the first and second oncoming clutches are actuated by respectively synchronizing the first and second oncoming clutches, and subsequently engaging the synchronized first and second oncoming clutches.

According to another embodiment of the present invention, a method is provided for executing a shift from an initial EVT mode to a target EVT mode in a multi-mode, electrically variable, hybrid transmission. The hybrid transmission is operable to receive power from an engine and one or more motor/generator assemblies. The initial EVT mode is established by the cooperative engagement of first and second off-going clutches, whereas the target EVT mode is established by the cooperative engagement of first and second oncoming clutches.

In this embodiment, the method includes: filling the first and second oncoming clutches to a predetermined pre-fill level; exhausting the first off-going clutch to a predetermined fill level, which operates to shift or transition the transmission to a first ETC mode; synchronizing and engaging the first oncoming clutch to thereby shift or transition the transmission to a second ETC mode; releasing both the first and second off-going clutches, which operates to shift or transition the transmission to a third ETC mode; and synchronizing and engaging the second oncoming clutch to thereby transition the transmission to the target EVT mode.

In accordance with another embodiment of the present invention, a multi-mode, electrically variable, hybrid transmission, is presented. The hybrid transmission includes two motor/generators assemblies, and three differential gear sets. Each differential gear set has first, second and third gear members. The first motor/generator is continuously connected to one of the differential gear sets, and controllable to provide power thereto. The second motor/generator is continuously connected to a different differential gear set, and controllable to provide power thereto.

The transmission also includes input and output members, and a plurality of torque-transmitting devices. The input member is drivingly connectable to an engine, and continuously connected to one of the aforementioned differential gear sets. The output member, on the other hand, is continuously connected to another of the differential gear sets, and preferably configured to transmit power to a final drive system.

The torque-transmitting devices and the first and second motor/generators are operable to provide various operating states in the multi-mode hybrid transmission. The plurality of torque-transmitting devices includes four clutches. In this embodiment, selective engagement of a first clutch establishes a first (initial) ETC mode, while selective engagement of a second clutch establishes a second (last) ETC mode, and selective engagement of both the first and second clutches establishes a third (intermediate) ETC mode. In a similar respect, selective engagement of both the first and third clutches establishes a first (initial) EVT mode, and selective engagement of both the second and fourth clutches establishes a second (target) EVT mode.

A controller is in operative communication with the various torque-transmitting devices, and configured to control operation of the same. The controller has a storage medium and a programmable memory. The controller is programmed and configured to determine if an EVT-to-EVT mode shift sequence is commanded, and respond to an EVT-to-EVT mode shift command by pre-filling the second and fourth clutches to a predetermined pre-fill level. The controller is also programmed and configured to exhaust the first clutch to a predetermined fill level and thereby transition the transmission to the first ETC mode. The controller then synchronizes and engages the second clutch, whereby the transmission shifts to the second ETC mode. The first and third clutches are contemporaneously released to thereby transition the transmission to the third ETC mode. Finally, the fourth clutch is synchronized and engaged to shift the transmission to the second EVT mode.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENT

Figure 1:
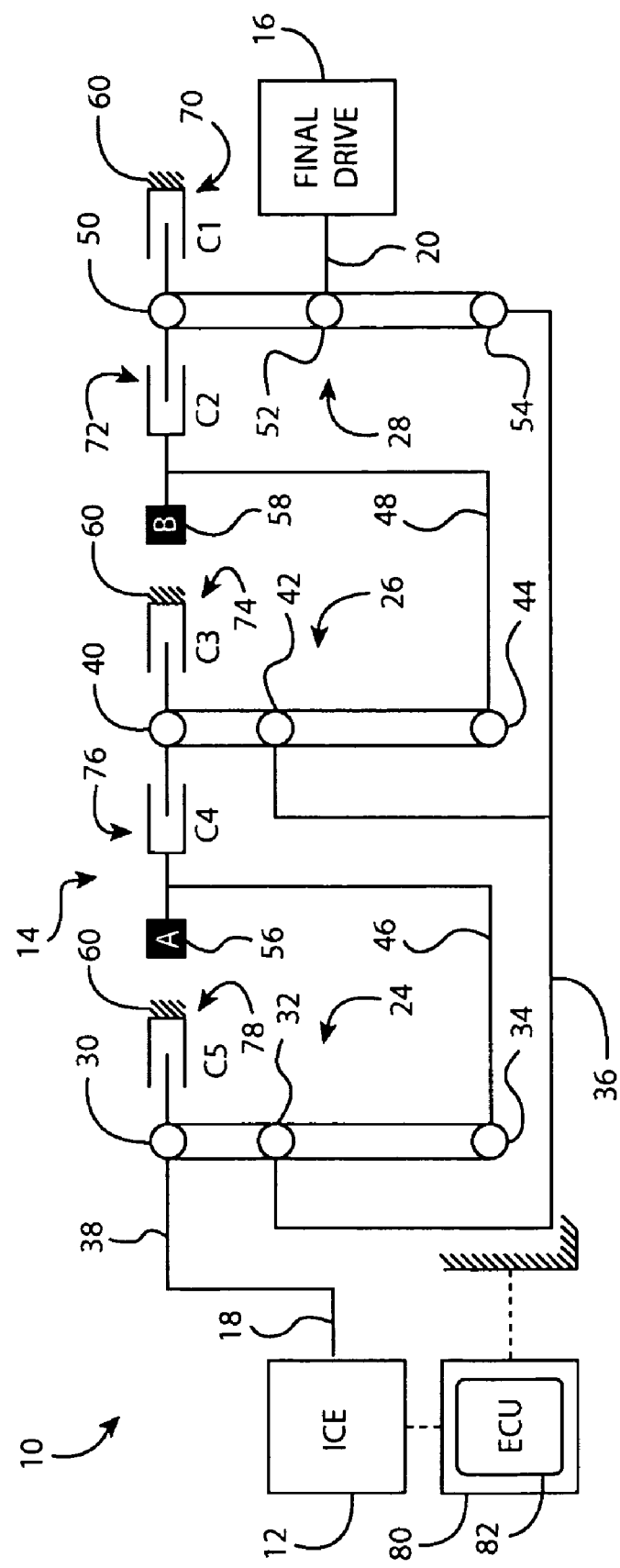
FIG. 1 is a schematic illustration of an exemplary vehicle powertrain with a multi-mode, electrically variable hybrid transmission in accordance with the present invention.

The present invention is described herein in the context of a hybrid-type vehicular powertrain having a multi-mode, multi-speed, electrically variable, hybrid transmission, which is intended solely to offer a representative application by which the present invention may be incorporated and practiced. Accordingly, the present invention is by no means limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle for that matter, may be found in the prior art.

Referring to the drawings, wherein like reference numbers refer to like components throughout the several views, there is shown in FIG. 1 a schematic depiction of an exemplary vehicle powertrain system, designated generally as 10. The powertrain 10 comprises a restartable engine 12 that is drivingly connected to, or in power flow communication with, a final drive system 16 via a multi-mode, electrically variable, hybrid-type power transmission 14. The transmission 14 is designed to receive at least a portion of its driving power from the engine 12, for example, through an input member 18. The transmission input member 18, which is preferably in the nature of a shaft, may be the engine output shaft (most commonly referred to as a "crankshaft"). Alternatively, a transient torque damper (not shown) or hydrodynamic torque converter may be implemented between the engine 12 and the input member 18 of the transmission 14. The engine 12 transfers power, preferably by way of torque, to the transmission 14, which, in turn, distributes torque through a transmission output member or shaft 20 to drive the final drive system 16, and thereby propel the vehicle (not specifically designated herein).

In the embodiment depicted in FIG. 1, the engine 12 may be any of numerous forms of petroleum-fueled prime movers, such as a reciprocating-piston type internal combustion engine, which may include spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in extensive detail hereinbelow.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted "first" to "third" in any order in the drawings (e.g., top to bottom, bottom to top, etc.) for each gear set.

The first planetary gear set 24 has three gear members: a first, second and third member 30, 32 and 34, respectively. In a preferred embodiment, the first member 30 consists of an outer gear member (typically designated as a "ring gear") that circumscribes the third member 34, which may consist of an inner gear member (commonly designated as a "sun gear"). In this instance, the second member 32 acts as a planet carrier member. That is, a plurality of planetary gear members (also referred to in the art as "pinion gears") is rotatably mounted on the second member/planet carrier 32. Each planetary gear member is meshingly engaged with both the first member/ring gear 30 and the third member/sun gear 34.

The second planetary gear set 26 also has three gear members: a first, second and third member 40, 42 and 44, respectively. In accordance with the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, however, the second member 52 is preferably the outer "ring" gear, which circumscribes the third member or inner "sun" gear 54. The ring gear member 52 is coaxially aligned and rotatable with respect to the sun gear member 54. The first member 50 is the planet carrier in this particular gear set. As such, a plurality of planetary or pinion gear members are rotatably mounted on the carrier member 50, each of aligned to meshingly engage both the ring gear member 52 and the sun gear member 54.

In a preferred embodiment, the first and second planetary gear sets 24, 26 each comprise simple planetary gear sets, whereas the third planetary gear set comprises a compound planetary gear set. However, each of the carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first planetary gear set 24, namely first member 30, for example, through an integral hub plate 38, for common rotation therewith. The third member 34 of the first planetary gear set 24 is continuously connected, for example, by a first sleeve shaft 46, to a first motor/generator assembly 56, which is also referred to herein as "Motor A". The third member 44 of the second planetary gear set 26 is continuously connected, for example, by a second sleeve shaft 48, to a second motor/generator assembly 58, also referred to herein as "Motor B". The second member 52 of the third planetary gear set 28 is continuously connected to transmission output member 20, for example, through an integral hub plate. The first and second sleeve shafts 46, 48 may circumscribe the central shaft 36.

A first torque transfer device 70 (or clutch "C1") selectively connects the first gear member 50 with a stationary member, represented in FIG. 1 by transmission housing 60. The second sleeve shaft 48, and thus gear member 44 and motor/generator 58, is selectively connectable to the first member 50 of the third planetary gear set 28 through the selective engagement of a second torque transfer device 72 (or clutch "C2"). A third torque transfer device 74 (or clutch "C3") selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76 (or clutch "C4"). An optional fifth torque transfer device 78 (or clutch "C5") selectively connects the engine 12 and the first gear member 40 of the second planetary gear set 26 to the transmission housing 60. The first and second torque transfer devices 70, 72 may be referred to as "output clutches", whereas the third and fourth torque transfer devices 74, 76 may be referred to as "holding clutches". The use of such terminology as "first clutch", "second clutch", "third clutch", etc. in the claims is not intended to limit such claims to C1, C2 and C3, respectively, but may indicate any of the aforementioned torque transfer devices.

In the exemplary embodiment depicted in FIG. 1, the various torque transfer devices 70, 72, 74, 76, 78 are all friction clutches. However, it is also contemplated that other conventional clutch configurations be employed, such as dog clutches, rocker clutches, etc. Each clutch is preferably hydraulically actuated, receiving pressurized hydraulic fluid from a pump (not shown). Hydraulic actuation of clutches C1-C5 is accomplished, for example, by using a conventional hydraulic fluid control circuit. Since the control circuit, per se, is not the subject of this invention, it will not be described in detail herein, it being understood that further information regarding the standard operation of a hydraulic fluid control circuit may be found in the prior art.

In the exemplary embodiment described herein, wherein the hybrid powertrain 10 is used as a land vehicle, the transmission output shaft 20 is operatively connected to the final drive system (or "driveline"), which may comprise a front or rear differential, or other torque transfer device, which provides torque output to one or more wheels through respective vehicular axles or half-shafts (none of which are explicitly illustrated). The wheels may be either front or rear wheels of the vehicle on which they are employed, or they may be a drive gear of a track vehicle. Although not specifically illustrated in FIG. 1, it should be appreciated that the final drive system may comprise any known configuration, including front wheel drive (FWD), rear wheel drive (RWD), four-wheel drive (4WD), or all-wheel drive (AWD), within the scope of the present invention.

All of the planetary gear sets 24, 26, 28, as well as the first and second motor/generators 56, 58, are preferably coaxially oriented, as about the axially disposed intermediate central shaft 36. The motor/generators 56, 58 may take on an annular configuration, which permits them to generally circumscribe the three planetary gear sets 24, 26, 28. This configuration assures that the overall envelope, i.e., the diametrical and longitudinal dimensions, of the hybrid transmission 14 are minimized.

The hybrid transmission 14 receives input motive torque from a plurality of "torque-generative devices", which include the engine 12 and motors/generators 56, 58, as a result of energy conversion from fuel stored in a fuel tank or electrical potential stored in an electrical energy storage device (neither of which is explicitly illustrated). That is, the engine 12, Motor A, and Motor B operate individually or in concert, in conjunction with the planetary gear sets and selectively engageable torque transmitting mechanisms highlighted above, to rotate the transmission output shaft 20. Moreover, the motor/generator assemblies A, B are preferably configured to selectively operate as both a motor and a generator. For instance, the motor/generator assemblies A, B are capable of converting electrical energy to mechanical energy (e.g., during vehicle propulsion), and converting mechanical energy to electrical energy (e.g., during regenerative braking).

With continuing reference to FIG. 1, an electronic control apparatus (or "controller"), comprising a distributed controller architecture, is shown schematically in an exemplary embodiment as a micro-processor based electronic control unit (ECU) 80. The ECU 80 has a storage medium with a suitable amount of programmable memory, collectively represented at 82, that is programmed to include, among other things, an algorithm or method 100 of regulating operation of a multi-mode hybrid transmission, as will be discussed in further detail below with respect to FIG. 4. The control apparatus of FIG. 1 is operable, as described hereinafter, to provide coordinated system control of the powertrain system depicted and described herein. The constituent elements of the control apparatus comprise a subset of an overall vehicle control system. The control system is operable to synthesize pertinent information and inputs, and execute control methods and algorithms to control various actuators to achieve control targets, including such parameters as fuel economy, emissions, performance, driveability, and protection of drivetrain hardware, such as, but certainly not limited to, the engine 12, transmission 14, first and second motor/generators 56, 58, and final drive 16.

The distributed controller architecture—i.e., ECU 80, may comprise a Transmission Control Module (TCM), an Engine Control Module (ECM), a Transmission Power Inverter Module (TPIM), a Battery Pack Control Module (BPCM), or any combination thereof. A hybrid control module (HCP) may be integrated to offer overall control and coordination of the aforementioned controllers. A User Interface (UI) is operatively connected to a plurality of devices (not individually shown) through which a vehicle operator typically controls or directs operation of the powertrain. Exemplary vehicle operator inputs to the UI include an accelerator pedal, a brake pedal, transmission gear selector, and vehicle speed cruise control. Each of the aforementioned controllers communicates with other controllers, sensors, actuators, etc., for example, via a local area network (LAN) bus. The LAN bus allows for structured communication of control parameters and commands between the various controllers. The specific communication protocol utilized is application-specific. By way of example, and certainly not limitation, one communication protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The ECM is operatively connected to the engine 12. The ECM is configured to acquire data from a variety of sensors and control a variety of actuators, respectively, of the engine 12 over a plurality of discrete lines. The ECM receives an engine torque command from the HCP, generates a desired axle torque, and an indication of actual engine torque, which is communicated to the HCP. Various other parameters that may be sensed by the ECM include engine coolant temperature, engine input speed to the transmission, manifold pressure, and ambient air temperature and pressure. Various actuators that may be controlled by the ECM include, for example, fuel injectors, ignition modules, and throttle control modules.

The TCM is operatively connected to the transmission 14, and functions to acquire data from a variety of sensors and provide command signals to the transmission 14. Inputs from the TCM to the HCP may include estimated clutch torques for each of the clutches C1-C5, and rotational speed of the transmission output shaft 20. Additional actuators and sensors may be used to provide additional information from the TCM to the HCP for control purposes.

Each of the aforementioned controllers is preferably a general-purpose digital computer, generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN.

In response to operator input, as captured by the UI, the supervisory HCP controller and one or more of the other controllers described above with respect to FIG. 1 determine required transmission output torque. Selectively operated components of the hybrid transmission 14 are appropriately controlled and manipulated to respond to the operator demand. For example, in the exemplary embodiment shown in FIG. 1, when the operator has selected a forward drive range and manipulates either the accelerator pedal or the brake pedal, the HCP determines an output torque for the transmission, which affects how and when the vehicle accelerates or decelerates. Final vehicle acceleration is affected by other variables, including such factors as road load, road grade, and vehicle mass. The HCP monitors the parametric states of the torque-generative devices, and determines the output of the transmission required to arrive at the desired torque output. Under the direction of the HCP, the transmission 14 operates over a range of output speeds from slow to fast in order to meet the operator demand.

The ECU 80 also receives frequency signals from sensors for processing into input member 18 speed, Ni, and output member 20 speed, No, for use in the control of transmission 14. The system controller may also receive and process pressure signals from pressure switches (not separately illustrated) for monitoring clutch application chamber pressures. Alternatively, pressure transducers for wide range pressure monitoring may be employed. PWM and/or binary control signals are transmitted by the controller 80 to transmission 14 for controlling fill and drain of clutches C1-C5 for application and release thereof. Additionally, the controller 80 may receive transmission fluid sump temperature data, such as from conventional thermocouple input (not shown), to derive a sump temperature, and provide PWM signal which may be derived from input speed Ni and sump temperature for control of line pressure via an appropriate regulator.

Fill and drain of clutches C1-C5 are effectuated, for example, by way of solenoid controlled spool valves responsive to PWM and binary control signals as alluded to above.

Trim valves are preferably employed using variable bleed solenoids to provide precise placement of the spool within the valve body and correspondingly precise control of clutch pressure during apply. Similarly, a line pressure regulator (not shown) may be of a solenoid controlled variety for establishing regulated line pressure in accordance with the described PWM signal. Clutch slip speeds across clutches are derived, for example, from transmission output speed, Motor A speed, and Motor B speed.

Figures 2, 3:
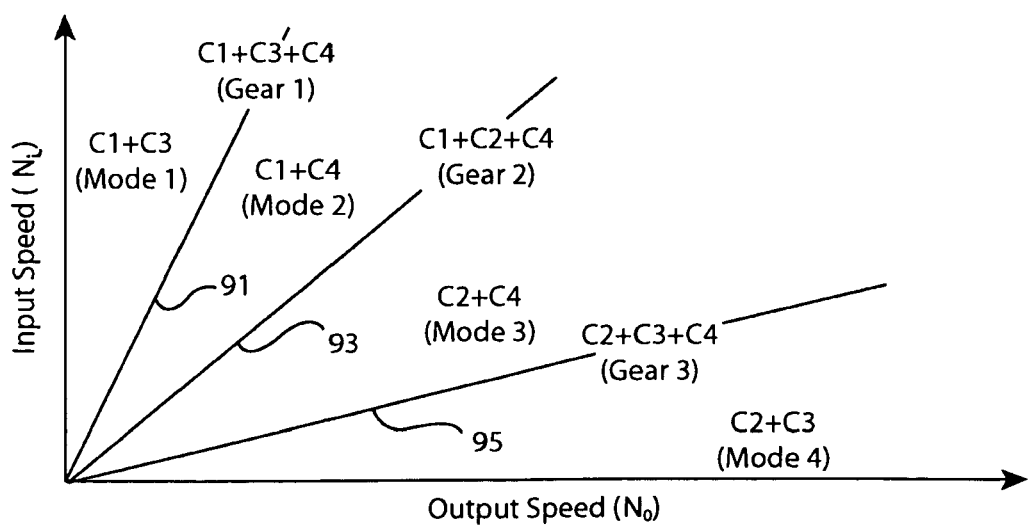
FIG. 2 is a truth table listing the engaged torque-transmitting mechanisms for each of the operating modes of the transmission illustrated in FIG. 1.
FIG. 3 is a graphical representation of various regions of operation with respect to input and output speeds of the transmission illustrated in FIG. 1.

The multi-mode, electrically variable, hybrid transmission operates in several transmission operating modes. The truth table provided in FIG. 2 presents the engagement schedule of the torque-transmitting mechanisms C1-C5 to achieve the array of operating state or modes. Put another way, the various transmission operating modes described in the table indicate which of the specific clutches C1-C5 are engaged or actuated, and which are released or deactivated for each of the operating modes.

There are four neutral modes presented in FIG. 2. In Neutral 1, all clutches are released. Neutral 1 may be when the entire vehicle is stopped an in an off-state, and thus there is no power distribution, electrical, mechanical, or otherwise, being actively distributed throughout the powertrain 10. In this instance, a standard 12-volt starting-lighting-and-ignition (SLI) battery may be used for engine start. In Neutral 2, only clutch C3 is engaged, and Motor A and Motor B react engine for start or charge. Similar to Neutral 2, when the transmission 14 is in Neutral 3, Motor A and Motor B react engine for start or charge with clutch C4 as the only engaged torque transmitting device. In Neutral 4, the third and fourth clutches C3, C4 are both in an activated state. In this instance, Motor A is locked or "grounded", and Motor B is geared with the engine 12 for engine start.

The first and second planetary gear sets 24, 26 cooperate with the first and second motor/generators 56, 58, along with the selective engagement of the first and second clutches C1, C2, to constitute an electric torque converter (ETC). By way of example, and not limitation, when the transmission 14 is operating in an "ETC Mode", the electric output of Motor A and/or Motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, Motor A reacts the engine 12 with the first and third planetary gear sets 24, 28, and Motor B freewheels. In this ETC mode, the stationary vehicle can be smoothly started with the engine 12 held at a suitable speed by gradually increasing the amount of electric power generated by Motor A—i.e., the reaction force of the Motor A.

There are two other alternative ETC Modes available utilizing the transmission configuration presented herein. ETC2 Mode, also known as "compound ETC", can be initiated by engaging clutch C2, and disengaging the remaining clutches. In ETC2 Mode, Motor A reacts the engine 12 with the first and third planetary gear sets 24, 26, while Motor B reacts the engine 12 and Motor A to the output member 20. The distribution of engine torque is manipulated through the cooperative management of the amount of electric power output generated by Motor A and Motor B. Alternatively, ETC12 Mode can be initiated by engaging both clutch C1 and clutch C2. Similar to ETC1 mode, Motor A reacts the engine 12 with the first and third planetary gear sets 24, 28. However, in this instance, Motor B is grounded to the transmission housing 60. In this ETC mode, the vehicle can be smoothly accelerated with the engine 12 held at a suitable speed by gradually increasing the reaction force generated by Motor A.

In another instance, when the engine 12 is in an off-state, the transmission can utilize the ETC mode clutch control schedule to vary the amount of electric energy generated by Motor A so as to gradually increase the drive torque of Motor A and/or Motor B. For example, if the transmission 14 is shifted into ETC1 Mode when the engine 12 is in an off-state, the engine 12 will create a reaction force, by way of input member 18. The motive output of the Motor A can then be controlled, and a continuous and uninterrupted transmission output torque maintained, without having to turn the engine 12 on.

The powertrain 10 also has three fixed gear (FG), or "direct", modes of operation. In all fixed gear modes, the vehicle is driven in the forward direction by operation of the engine 12. The simultaneous engagement of clutches C1, C3 and C4 shifts the transmission 14 into FG1 Mode. In FG1, Motor A is grounded, and the engine drives the first planetary gear set 24 to the third planetary gear set 28 and, thus, the output member 20. FG2 Mode is achieved by the selective engagement of clutches C1, C2 and C4. In FG 2, Motor B is grounded, and the engine 12 drives the first and second planetary gear sets 24, 26 to the third planetary gear set 28 and, thus, the output member 20. Likewise, FG3 Mode is achieved by the concurrent engagement of clutches C2, C3 and C4. In FG3, Motor A is locked, and the engine drives the first planetary gear set 24 to the second and third planetary gear sets 26, 28 and the output member 20. When operating in a FG mode of operation, the output member speed No is directly proportional to input member speed Ni and the selected gear ratio: Ni=No×GR.

With continued reference to FIG. 2, the transmission 14 is also operable to operate in four electrically variable transmission (EVT) modes. Electrically variable operating modes may be separated into four general classifications: input-split mode, output-split mode, compound-split mode, and series modes. In an input-split mode, one motor/generator is geared such that its speed varies in direct proportion to the transmission output, and another motor/generator is geared such that its speed is a linear combination of the input and output member speeds. In an output-split operating mode, one motor/generator is geared such that its speed varies in direct proportion to the transmission input member, and the other motor/generator is geared such that its speed is a linear combination of the input member and the output member speeds. A compound-split mode, on the other hand, has both motor/generators geared such that their speeds are linear combinations of the input and output member speeds, but neither is in direct proportion to either the speed of the input member or the speed of the output member. Finally, when operating in a series mode, one motor/generator is geared such that its speed varies in direct proportion to the speed of the transmission input member, and another motor/generator is geared such that its speed varies in direct proportion to the speed of the transmission output member. There is no direct mechanical power transmission path between the input and output members when operating in series mode, and therefore all power must be transmitted electrically.

In each of the four types of electrically variable operating modes indicated above, the speeds of the motors $N_a$ and $N_b$ are linear combinations of the input and output speeds $N_i$ and $N_o$. Thus, these modes have two speed degrees of freedom (abbreviated hereinafter for simplicity as "DOF"). Mathematically, the speed and torque equations of these class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix}$$

and $$\begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of B coefficients. That is, if $b_{21}=b_{12}=0$ or $b_{11}=b_{22}=0$, the mode is a series mode. If $b_{11}=0$ or $b_{12}=0$, the mode is an input split mode. If $b_{21}=0$ or $b_{22}=0$, the mode is an output split mode. If each of $b_{11}$, $b_{12}$, $b_{21}$, and $b_{22}$ are nonzero, for example, the mode is a compound split mode.

An electrically variable transmission may also contain one or more fixed gear (FG) modes. In general, FG modes result from closing (i.e., actuating) one additional clutch than the number required to select an electrically-variable mode. In FG modes, the speed of the input $N_i$ and each motor $N_a$, $N_b$ are proportional to the speed of the output $N_o$. Thus, these modes have only one speed DOF. Mathematically, the speed and torque equations of these class of modes take the form:

$$[T_b] = [a_{1,1} \; a_{1,2} \; a_{1,3}] \begin{bmatrix} T_a \\ T_i \\ T_o \end{bmatrix}$$

and $$\begin{bmatrix} N_a \\ N_b \\ N_i \end{bmatrix} = [b_{1,1} \; b_{1,2} \; b_{1,3}][N_o]$$

where a and b are coefficients determined by the transmission gearing. If $b_{11}$ is nonzero, motor A can contribute to output torque during operation in the fixed gear mode. If $b_{12}$ is nonzero, motor B can contribute to output torque during operation in the fixed gear mode. If $b_{13}$ is nonzero, the engine can contribute to output torque during operation in the fixed gear mode. If $b_{13}$ is zero, the mode is an electric-only fixed gear mode.

An EVT may also contain one or more modes with three speed DOF. These modes may or may not include reaction torque sources such that the transmission is capable of producing output torque proportional to engine torque or motor torque. If a mode with three speed DOF is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed DOF, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the ESD as a function of the output torque and the speed of the engine, output, and one of the motors. Mathematically, the speed and torque equations of this class of modes take the form:

$$\begin{bmatrix} T_a \\ T_b \\ T_i \end{bmatrix} = [a_{1,1} \; a_{1,2} \; a_{1,3}][T_o]$$

and $$[N_b] = [b_{1,1} \; b_{1,2} \; b_{1,3}] \begin{bmatrix} N_a \\ N_i \\ N_o \end{bmatrix}$$

where a and b are coefficients determined by the transmission gearing. If $a_{11}$ is nonzero, motor A serves as a reaction member and its torque is proportional to output torque when operating in the ETC mode. If $a_{11}$ is zero, motor A is disconnected and its torque is not determined by the output torque. If $a_{12}$ is nonzero, motor B serves as a reaction member and its torque is proportional to output torque when operating in the ETC mode. If $a_{12}$ is zero, motor B is disconnected and its torque is not determined by the output torque. If $a_{13}$ is nonzero, the engine can contribute to output torque during operation in the fixed gear mode. If $a_{13}$ is zero, the input is disconnected and its torque is not determined by the output torque. If all of $a_{11}$, $a_{12}$, and $a_{13}$ are zero, the mode is a neutral mode that is not capable of producing output torque.

In EVT1 and EVT4, the transmission 14 is operating in what is known as an "input-split" mode of operation, wherein the output speed No of the transmission 14 is proportional to the speed of one motor/generator. Specifically, EVT1 Mode is achieved through the simultaneous engagement of the first and third clutches C1 and C3. When in EVT1, Motor A functions to react the engine 12 with the first planetary gear set 24, to the third planetary gear set 28, and the output member 20, while Motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, Motor A functions to react the engine 12 with the first planetary gear set 24, to the second and third planetary gear sets 26, 28, and the output member 20, while Motor B drives the second and third planetary gear sets 26, 28. Motor B propels the vehicle in EVT 4.

In EVT2 and EVT3, the transmission 14 is operating in what is known as a "compound-split" mode of operation, wherein the output speed No of the transmission 14 is not proportional to the speed of a single motor/generator, but is rather an algebraic linear combination of the speeds of both motor/generators. More particularly, EVT2 is achieved through the cooperative engagement of the first and fourth clutches C1, C4. In this maneuver, Motor A and Motor B operate to react the engine 12 with the first and second planetary gears sets 24, 26. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

With reference to FIG. 3, a plot of transmission output speed, No, along the horizontal axis versus input speed, Ni, across the vertical axis is illustrated. FIG. 3 is a graphical representation of the preferred regions of operation for each operating mode with respect to input and output speeds of the transmission 14. For instance, synchronous operation in FG1, that is the input speed and output speed relationships whereat clutches C1, C3 and C4 are operating simultaneously with substantially zero slip speed thereacross, is represented by line 91. As such, line 91 represents the input and output speed relationships substantially whereat synchronous shifting from between modes can occur, or where direct mechanical coupling from input to output can be effected by simultaneous application of clutches C1, C3 and C4—i.e., fixed-ratio. Synchronous operation in FG2, that is the input speed and output speed relationships whereat clutches C1, C2 and C4 are operating simultaneously with substantially zero slip speed thereacross, is represented by line 93. Likewise, the relationships between input and output speed during operation in FG3, whereat clutches C2, C3 and C4 are operating simultaneously with substantially zero slip speed thereacross, is represented by line 95.

To the left of the shift ratio line 91 is a preferred region of operation for the first EVT mode—i.e., EVT1, identified as "Mode 1" in FIG. 3, wherein both C1 and C3 are applied, and C2 and C4 are released. To the right of the shift ratio line 91 and left of shift ratio line 93 is a preferred region of operation for the second EVT mode—i.e., EVT2, identified as "Mode 2" in FIG. 3, wherein C1 and C4 are applied, and C2 and C3 are released. To the right of shift line 93 and left of shift ratio line 95 is a preferred region of operation for the third EVT mode—i.e., EVT3, identified as "Mode 3" in FIG. 3, whereat both C2 and C4 are applied, and C1 and C3 are released. To the right of the shift ratio line 95 is a preferred region of operation for the fourth EVT mode—i.e., EVT4, identified as "Mode 4" in FIG. 3, wherein C2 and C3 are applied, and C1 and C4 are released. As used herein with respect to clutches C1-C5, the term "applied" or "actuated" indicates substantial torque transfer capacity across the respective clutch. Antithetically, the term "released" or "deactivated" indicates insubstantial or no torque transfer capacity across the respective clutch.

While the preferred regions of operation specified above are generally favored for the operation of the hybrid transmission 14, it is not meant to imply that the various EVT regions of operation depicted in FIG. 3 cannot or do not overlap. Generally, however, it is preferred to operate in the specified regions because those particular modes of operation preferably employ gear sets and motor hardware particularly well suited in various aspects (e.g., mass, size, cost, inertial capabilities, etc.) for that region. Similarly, while the individual regions of operation specified above are generally preferred for the particular modes of operation indicated, it is not meant to imply that the regions of operation for the individual EVT modes cannot be switched. A shift into Mode 1 is considered a "downshift", and is associated with a higher gear ratio in accordance with the relationship of Ni/No. In contrast, a shift from into Mode 4 is considered an "upshift", and is associated with a lower gear ratio in accordance with the relationship of Ni/No. As highlighted hereinbelow, other Mode-to-Mode shift sequences are feasible. By way of example, a shift from EVT1 to EVT3 is also an upshift, while a shift from EVT4 to EVT2 is considered a downshift.

Figure 4:
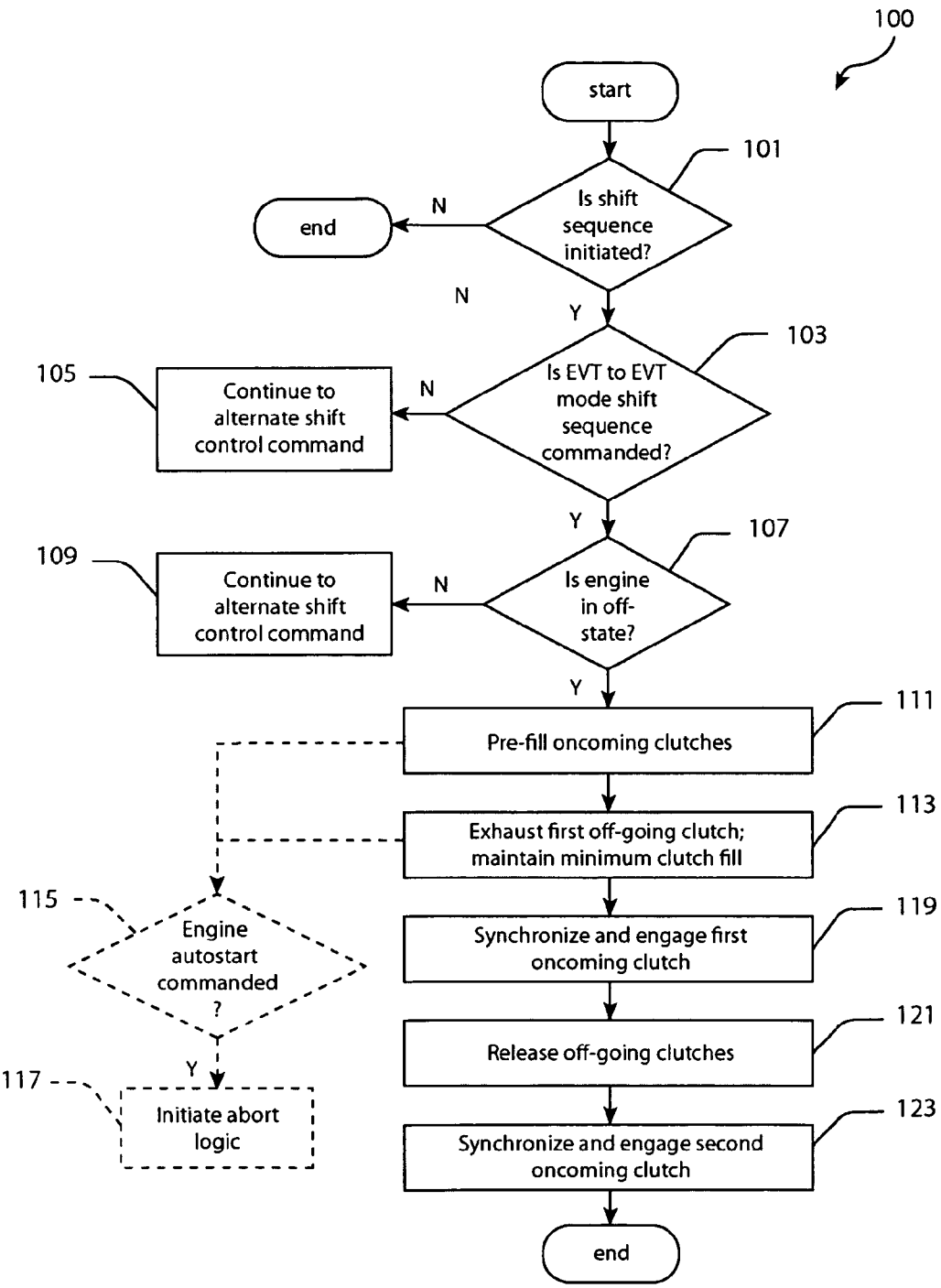
FIG. 4 is a flow chart or block diagram illustrating a shift control method in accordance with the present invention.

With reference now to the flow chart shown in FIG. 4, a control algorithm for regulating operation of a multi-mode hybrid transmission, namely an improved method for executing a shift from a first, initial EVT mode to a second, target EVT mode, is shown generally at 100 in accordance with a preferred embodiment of the present invention. The method or algorithm 100 is described herein with respect to the structure illustrated in FIG. 1, preferably executed as algorithms in the controllers of the control system described hereinabove, to control operation of the system described with reference to FIG. 1. However, the present invention may also be incorporated into other powertrain arrangements without departing from the intended scope of the claimed invention.

The method 100 begins at step 101, whereat an initiated shift sequence is detected. If a shift sequence is not initiated, for example, by operator command or change in vehicle operating conditions, the algorithm terminates and the transmission 14 will continue in its current state of operation. If a shift sequence is initiated—e.g., via operator "tip-in", the ECU 80 will determine, in step 103, whether the shift maneuver should be an EVT-to-EVT transition. That is, based upon the current vehicle operating conditions, vehicle speed, magnitude of desired torque change, etc., the ECU 80 will determine if the optimal shift maneuver is from one EVT operating mode to another EVT operating mode. If not, the ECU 80, namely the TCM, will continue to an alternate shift sequence (or "shift control command") that will provide for optimal shifting under the current operating conditions, as indicated in step 105 of FIG. 4. That is, unless a shift through ETC mode is preferred by the shift schedule. For example, the EVT 10 presented herein can perform an EVT1 to EVT2 shift through either ETC1 or FG1. FG1 may be preferred, but there may be conditions in which a shift through ETC is desirable.

Prior to, contemporaneously with, or subsequent to steps 101 and 103, the HCP can determine if the engine is in an off-state at 107. Although the shift control methodology presented in FIG. 4 can be employed during engine-on or engine-off vehicle operation, it is most beneficial if used when the engine 12 is turned off. As such, if the engine is on, the method 100 will proceed to step 109, and continue to an alternate shift sequence that will provide for optimal shifting under the current operating conditions.

If an EVT-to-EVT shift sequence is initiated under engine-off vehicle operation, the TCM will respond, as indicated in step 111, by immediately by pre-filling the "oncoming" clutches associated with the target EVT mode to a predetermined pre-fill level. By way of example, if the transmission 14 is to make an EVT1 to EVT3 upshift, the off-going clutches associated with initial, active EVT mode are C1 and C3, while the oncoming clutches associated with the target, desired EVT mode are C2 and C4. The clutch volume for each oncoming clutch mechanism, such as C2 and C4, can be filled to 80-90% without achieving torque capacity or an inordinate amount of slip, which would otherwise interfere with the current operating mode. This pre-fill strategy helps to shorten the overall shift time of the EVT-to-EVT maneuver by reducing sequential fill times.

During the pre-fill stage (step 111), the first "off-going" clutch associated with the current or initial EVT mode is exhausted by the TCM to a predetermined fill level in step 113. In the exemplary embodiment presented above, that would mean that the fluid in the clutch volume for clutch C3 is reduced to a predetermined fill level. This particular level may be equivalent to the pre-fill level discussed above with respect to clutches C2 and C4 in step 111, or may be a different fill level, so long as the clutch volume for C3 is sufficiently exhausted to allow the transmission to shift or transition to a first ETC mode, in this case ETC1, and not diminish overall system efficiency.

Once the first ETC mode is achieved, for example, through the offload of clutch C3, the TCM will command the first on-coming clutch, in this case clutch C2, be synchronized, filled and locked, in step 119. In so doing, the transmission 14 is shifted to a second ETC mode, namely ETC12 Mode (see FIG. 2), through the contemporaneous engagement of first and second clutches C1, C2. As soon as the transmission 14 shifts to the second ETC mode, C3 is completely exhausted from the pre-filled state. C1 is then released to allow the system to transition to the third ETC mode, namely, ETC2, with only C2 engaged. Finally, in step 123, the second on-coming clutch, in this case clutch C4, is synchronized, filled and locked. Through the coordinated engagement of both the first and second on-coming clutches, such as C2 and C4 in the exemplary embodiment, the transmission 14 is shifted into the target EVT mode, or EVT3 Mode.

The methodology presented above allows a multi-mode, electrically variable, hybrid transmission to shift between different EVT modes when the engine is off, while maintaining propulsion capability and minimum time delay for engine autostart. The shift control maneuver is able to maintain zero engine speed while producing continuous output torque throughout the EVT-to-EVT shift by eliminating transitions through fixed gear or neutral modes, utilizing, instead, transitional ETC modes. The optional oncoming clutch pre-fill strategies minimize the time required to complete the shift.

Mid-point abort logic may be implemented to reduce the engine start delay if an intermittent autostart operation is initiated. During normal operation of a hybrid vehicle, it is common for the control system to intermittently turn the engine assembly on and off during vehicle propulsion. Correspondingly, during the shift sequence from the initial EVT mode to the target EVT mode, the system may request the engine 12 be turned back on ("engine autostart"), which is represented schematically at 115 in FIG. 4. If this occurs, the transmission has to shift to an EVT mode before the engine can be restarted. Accordingly, if an engine autostart command is received after the EVT-to-EVT shift maneuver is commenced (i.e., 115=yes), the TCM will respond by initiating an abort sequence, represented at 117.

The TCM will monitor, detect or otherwise determine if a predetermined transition midpoint has been reached. Ideally, the predetermined transition midpoint is when the first oncoming clutch is filled and locked, and the transmission has shifted into the second ETC mode. When engine start command is received prior to the mid-point, the system will abort back to the initial EVT mode (e.g., EVT1). If, however, the command is received during or after the mid-point has passed, the method will continue to shift toward the target EVT mode. To accommodate the abort back to initial EVT mode, the first off-going clutch is not fully exhausted in step 113, but rather stays in a partially filled state in case it needs to be refilled. The first off-going clutch will be completely exhausted once the predetermined mid-transition point is passed to reduce any clutch drag that may detrimentally affect the system efficiency.

The method 100 preferably includes at least steps 101-123. However, it is within the scope and spirit of the present invention to omit steps, include additional steps, and/or modify the order presented in FIG. 4. It should be further noted that the method 100 represents a single shift sequence. However, it is expected, as indicated above, that the method 100 be applied in a systematic and repetitive manner. Finally, the use of such terminology as "sensing", "detecting", "measuring", "calculating", or otherwise "determining" is not intended as limiting, and should be considered relatively interchangeable.

While the best modes for carrying out the present invention have been described in detail, those familiar with the art to which this invention pertains will recognize various alternative designs and embodiments for practicing the invention within the scope of the appended claims.

The invention claimed is:

1. A method for regulating operation of a multi-mode hybrid transmission drivingly connectable to an engine, the method comprising:

deactivating a first of at least two off-going clutches operable to control the transmission in a first electrically variable transmission (EVT) mode to transition into a first Electronic Torque Converter (ETC) mode;

actuating a first of at least two oncoming clutches operable to control the transmission in a second EVT mode after deactivating said first of said at least two off-going clutches to transition into a second ETC mode;

deactivating a second of said at least two off-going clutches operable to control the transmission in said first EVT mode after actuating said first of said at least two oncoming clutches to transition into a third ETC mode; and actuating a second of said at least two oncoming clutches operable to control the transmission in said second EVT mode after deactivating said second of said at least two off-going clutches to thereby transition the transmission into said second EVT mode;

wherein the engine is in an off-state during deactivation of said first and second off-going clutches and actuation of said first and second oncoming clutches; and wherein said transition from said first EVT mode into said second EVT mode includes a lack of transition through a neutral mode and a lack of transition through a Fixed Gear (FG) mode, with the transmission continuously producing an output torque.

2. The method of claim 1, further comprising:

determining if an engine autostart operation is commanded;

determining if a predetermined transition midpoint has been reached; and commanding an abort sequence if said engine autostart operation is commanded and said predetermined transition midpoint has not been reached.

3. The method of claim 2, wherein said predetermined transition midpoint includes said first oncoming clutch being actuated.

4. The method of claim 2, wherein said abort sequence includes transitioning the transmission back to said first EVT mode.

5. The method of claim 1, wherein said deactivating said first off-going clutch includes exhausting said first off-going clutch to a predetermined fill level prior to said actuating said first oncoming clutch, and releasing said first off-going clutch after said actuating said first oncoming clutch.

6. The method of claim 1, further comprising:

determining if an EVT-to-EVT mode shift sequence is commanded; and filling said at least two oncoming clutches to a predetermined pre-fill level if an EVT-to-EVT mode shift sequence is commanded.

7. The method of claim 6, wherein said actuating said first and second oncoming clutches respectively includes synchronizing said first and second oncoming clutches and thereafter engaging said synchronized first and second oncoming clutches.

8. A method for executing a shift from an initial electrically variable transmission (EVT) mode to a target EVT mode in a multi-mode, electrically variable, hybrid transmission operable to receive power from an engine and at least one motor/generator assembly, the initial EVT mode cooperatively established by first and second off-going clutches, and the target EVT mode cooperatively established by first and second oncoming clutches, the method comprising:

filling the first and second oncoming clutches to a predetermined pre-fill level;

exhausting the first off-going clutch to a predetermined fill level to thereby transition the transmission to a first electric torque converter (ETC) mode;

synchronizing and engaging the first oncoming clutch after exhausting said first off-going clutch to thereby transition the transmission to a second ETC mode;

releasing the first and second off-going clutches after synchronizing and engaging the first oncoming clutch to thereby transition the transmission to a third ETC mode; and synchronizing and engaging the second oncoming clutch after releasing the first and second off-going clutches to thereby transition the transmission to the target EVT mode.

9. The method of claim 8, wherein the engine is in an off-state during the shift from the initial EVT mode to the target EVT mode.

10. The method of claim 8, wherein the shift from the initial EVT mode to the target EVT mode is characterized by a lack of a transition through a neutral mode or a fixed gear (FG) mode.

11. The method of claim 8, further comprising:

determining if an engine autostart operation is initiated;

determining if the first oncoming clutch is synchronized and engaged if said engine autostart operation is commanded;

commanding the transmission to shift back to the initial EVT mode if the first oncoming clutch is not synchronized or engaged.

* * * * *